INVENTOR.
William D. Walters.
BY
Harness, Dickey & Pierce
ATTORNEYS.

INVENTOR.
William D. Walters
BY
Harness, Dickey & Pierce
ATTORNEYS.

April 18, 1967 W. D. WALTERS 3,314,125

MULTIPLE MACHINING DEVICE

Filed Oct. 21, 1964 11 Sheets-Sheet 3

INVENTOR.
William D. Walters
BY
Harness, Dickey & Pierce
ATTORNEYS

April 18, 1967 W. D. WALTERS 3,314,125

MULTIPLE MACHINING DEVICE

Filed Oct. 21, 1964 11 Sheets-Sheet 4

INVENTOR.
William D. Walters
BY
Harness, Dickey & Pierce
ATTORNEYS

INVENTOR
William D. Walters
BY
Harness, Dickey & Pierce
ATTORNEYS.

INVENTOR.
William D. Walters.
BY
Harness, Dickey & Pierce
ATTORNEYS.

MULTIPLE MACHINING DEVICE

Filed Oct. 21, 1964

INVENTOR.
William D. Walters.
BY
Harness, Dickey & Pierce
ATTORNEYS.

INVENTOR.
William D. Walters
BY
Harness, Dickey & Pierce
ATTORNEYS.

INVENTOR.
William D. Walters
BY
Harness, Dickey & Pierce
ATTORNEYS.

INVENTOR.
William D. Walters.
BY
Harness, Dickey & Pierce
ATTORNEYS.

April 18, 1967 W. D. WALTERS 3,314,125

MULTIPLE MACHINING DEVICE

Filed Oct. 21, 1964

11 Sheets-Sheet 11

INVENTOR.

William D. Walters

BY

Harness, Dickey + Pierce

ATTORNEYS.

United States Patent Office 3,314,125
Patented Apr. 18, 1967

3,314,125

MULTIPLE MACHINING DEVICE

William D. Walters, Ridgewood, N.J., assignor to Standard Tool & Manufacturing Company
Filed Oct. 21, 1964, Ser. No. 405,451
17 Claims. (Cl. 29—38)

This invention relates to machine devices for producing multiple operations, and particularly to a machine device which advances workpieces to machine tools for performing work operations seriatim thereon.

The machine of the present invention has a rotatable table driven by a cam which advances the table the distance between the work stations and thereafter dwells for a predetermined time while the cam is being driven. During the dwell time, machine operations are performed on workpieces which are supported at the periphery of the table and accurately located at each station each advancement of the table. Various types of machines may be employed at the stations depending upon the type of workpiece which is to be machined. The machine tools of the present invention have a standard base and feed mechanism which is equipped with tools for performing milling, drilling and reaming operations progressively upon a workpiece as it is advanced from one station to another. The workpiece herein illustrated in FIGS. 15 to 19 to be operated on by the machine tools at the various stations embodies a hollow cylindrical sleeve having a solid head at the top and a flange in the center and a greater outside diameter between the head and flange.

At the first station the workpiece is loaded in the machine. In the second station the machine tool thereat rough mills a sloping side on the end of the workpiece below the flange. At the third station the machine tool thereat finish mills the sloping side. At the fourth station a No. 60 drill is passed through two walls of the body portion adjacent to the top of the flange. At the fifth, sixth, seventh and eighth stations the machine tools thereat drill a hole through one wall in the workpiece in alignment with each other and the hole drilled through the body above the flange. At the ninth station a flat is milled on the side of the head and at the tenth station two flat sides 90° from the first flat side are straddle milled on the head. At the thirteenth station a No. 60 drill is passed through both walls of the workpiece in 90° relationship to, but in the plane with, the hole drilled through the two walls at the fourth station. At the fourteenth station a No. 30 drill is passed through the body above the aperture in the tube directly beneath the head and at station 15 a No. 30 drill is passed downwardly on the axis of the head in communication with the hole drilled by the No. 30 drilled at right angles thereto at the fourteenth station. At the same time a No. 30 reamer is moved upwardly into the sleeve to debur the sloping opening produced by the milling operations at stations two and three. At station 16 the finished workpiece is ejected from the holder.

After the simultaneous operation at the stations, a shot pin is moved out of an aperture in the table which retained it in exact position and the table is advanced to move the workpieces to the next stations whereupon the shot pin is inserted in an aperture in the table to accurately locate the table relative to the new stations. At the same time, a pin is moved upwardly at the loading station between clamping jaws so as to permit the operator to place a workpiece over the pin to locate it accurately in a holding sleeve. The clamping jaws are closed about the sleeve upon the next advancement of the table which advances the head of the workpiece beneath a cam surface which moves it down upon the sleeve to accurately locate within the jaws. If the table is advanced every four or five seconds, this means that a completely finished workpiece will be ejected each four or five seconds, accurately drilled, milled and reamed to precise dimensions.

A series of cams are driven in synchronism with the table for operating plungers which advances a column of liquid to actuate plungers in each machine tool base for advancing the machine tools to perform the work operations by the drills, mills and reamers as they are being driven in rotation. Springs are compressed during the advancement of the machine tool bases which return the tools to their starting position and the plungers to their initial positions. A cam disc synchronized with the driving of the table tilts a lever mechanism to move the shot pin and the workpiece receving pin into and out of positions at the end of each advancement of the table and before the next advancement thereof. Once the machine is set up it runs continuously requiring only the loading of the workpieces over the receiving pin at the loading station every four or five seconds, which may be accomplished manually or through hopper-feed means, as is well known in the art. A coolant is provided for the tools which is collected in a peripheral trough and directed into a tank from which it is pumped back to the tools for cooling and aiding in the cutting operations.

Accordingly, the main objects of the invention are: to provide a machine for performing a plurality of work operations simultaneously on like workpieces which are advanced from one to adjacent stations so that each advancement of the machine will produce a finished workpiece; to synchronize the advancement of a table carrying workpieces to a plurality of stations with cam means for advancing the tools to perform the work to be accomplished at each station after the table is stopped and accurately located; to move a locating pin between the clamping jaws at the receiving station on which a workpiece is placed and located downwardly within the jaws as the jaws are moved to clamp the workpiece, and in general, to provide a full automatic, continuously operating machine for performing work operations simultaneously on a plurality of workpieces as they are advanced to the stations which is simple in construction, positive in operation and economical of manufacture.

Other objects and features and novelty of the invention will be specifically pointed out or will become apparent when referring, for a better understanding of the invention, to the following description taken in conjunction with the accompanying drawings, wherein:

FIG. 2 is a broken view in elevation of the machine illustrated in FIG. 1;

FIG. 7 is a view in elevation of the structure illustrated in FIG. 6 with parts in section;

FIG. 23 is a broken view of the structure, similar to that illustrated in FIG. 12, showing a further form of the invention;

FIG. 24 is an enlarged view of the structure illustrated in FIG. 7 taken within the circle 24 thereof.

Figure 1:
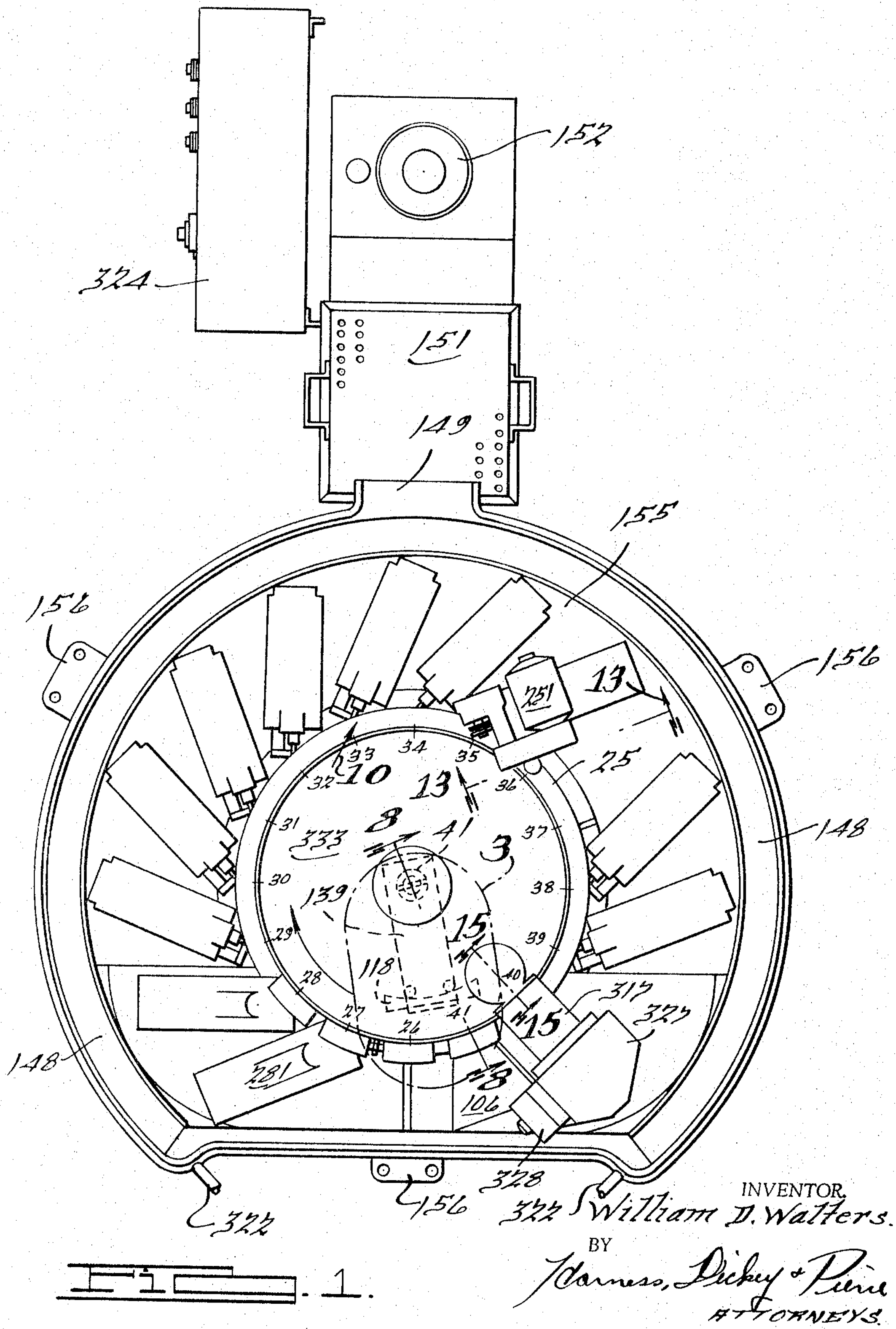
FIGURE 1 is a plan view of a machine showing the machine tools for performing work at the various stations.

The machine of the present invention has a circular table 25 which is advanced the distance between stations 26 to 42 by a drive mechanism which dwells thereafter for a predetermined time. The table 25 is supported on bearings and driven about a fixed central pillar 41. The housing 40 containing the drive is of a standard type known as Model ST–A9AB and furnished in the trade by the assignee company. The drive embodies a drive shaft 44 having a pulley 45 thereon driven by a belt 46 from a pulley 47 of a motor 48. The shaft 44 drives a worm for driving a worm wheel which operates a cam wheel which engages cam followers on the bottom face of the table supporting plate which employs a fraction of the rotation for advancing the table by one portion of the cam, the greater portion thereof dwells the table which remains stationary.

The opposite end of the shaft 44 carries a cam plate 49 having a cam track 51 therein. A roller 52 on the end of a link 53 extends within the cam track 51 and tilts the link on a shaft 54 on a support 55. A link 56 in extension of the link 53 has a shot pin 57 secured thereto by a pin 58 in a slot 59 through the link. The link 56 has a link 61 offset therefrom and secured thereto for supporting a shaft 62 within a bearing sleeve 63 on a pin 64 within a slot 65 at the end of the link 61. A bracket 66 on the upper end of the shaft 62 supports a work-receiving pin 67 over which the tubular stem of the workpiece is placed at the loading station. The shot pin 57 is guided in bushings 68 and provided with four faces 69 at the end which enter a bushing 71 in the table, one for each station for accurately locating the table 25 after each advancement thereof. Near the end of the dwell time of the table by the driving mechanism 40, the cam track 51 will raise the roller 52 and tilt the links 56 and 61 downwardly thereby moving the shot pin 57 and the pin 67 to retracted position where they will be retained by the length of the cam surface portion 72 until the table 25 has been advanced to the next station. At that time the roller 52 will move into the cam surface portion 73 to move the links 56 and 61 upwardly to insert the shot pin 57 within the bushing 71 and move the pin 67 in position to receive a workpiece. The roller 52 will continue to travel along the cam surface portion 73 during the time the table is at rest and the machine operations are being performed. The support 55 has a head 74 for supporting the shaft 54 which is retained against rotation by a set screw 75. The link 53 is welded to a boss 76 containing a sleeve bearing 77 which rotates on one end of the shaft 54. A bridging block 78 is welded to the boss 76 to which a boss 79 is welded at the opposite end containing a bearing 81 which rotates on the opposite end of the shaft 54 from the boss 76. The link 61 is welded to the link 56 in extension of the link 53. A bracing bar 82 strengthens the upright 55 when secured thereto and to a plate 83, which is attached to a boss plate 84 by bolts 85. A supporting plate 86 is secured to side face members 87 and to the central upright member 88.

Figures 8, 9, 25:
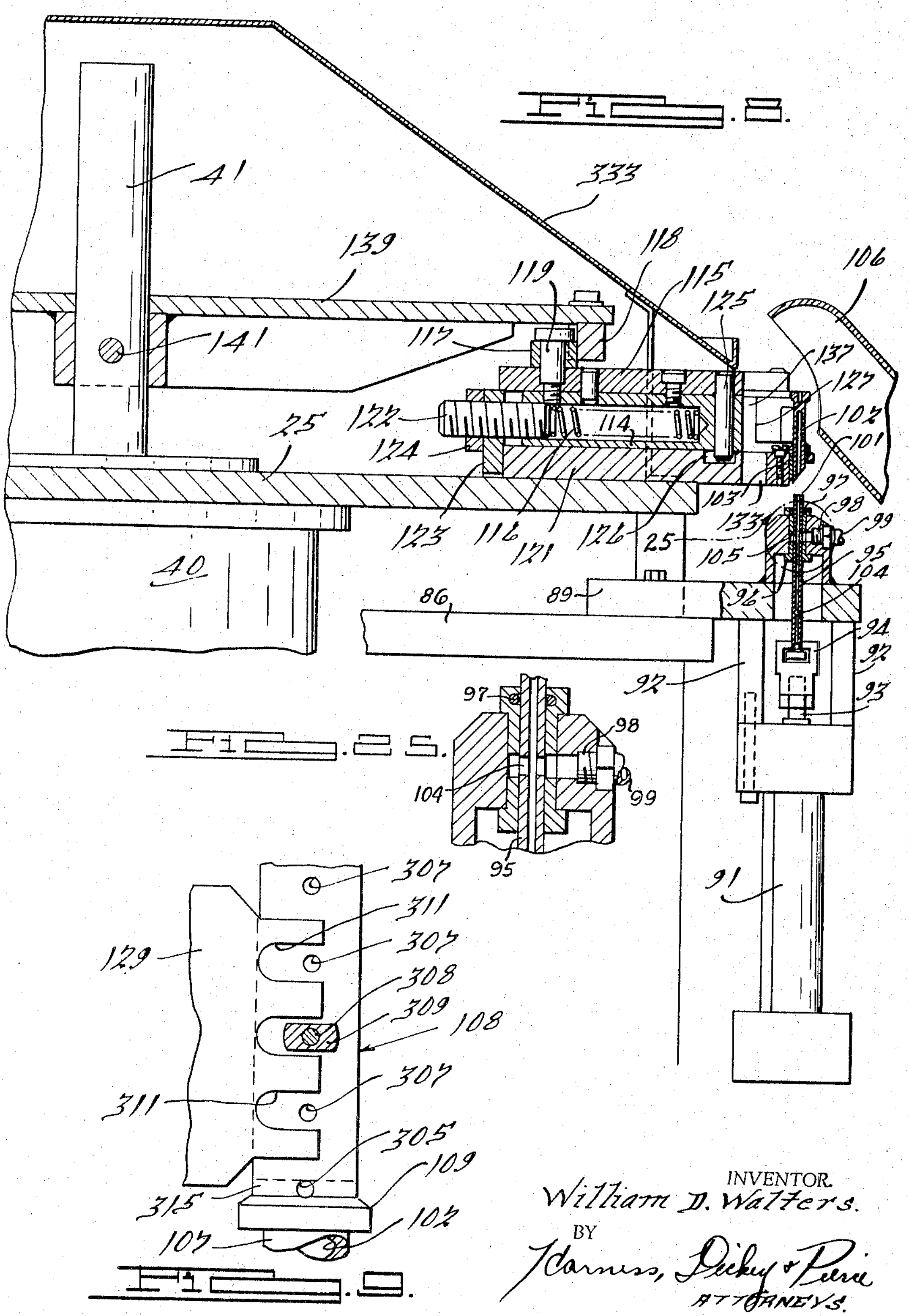
FIG. 8 is an enlarged broken sectional view of the structure illustrated in FIG. 1, taken on the line 8—8 thereof.
FIG. 9 is an enlarged broken sectional view of the structure illustrated in FIG. 3, as viewed from the point 9 thereof.
FIG. 25 is an enlarged view of the structure illustrated in FIG. 8, taken within the circle 25 thereof.
Figures 15, 16, 17, 18, 19:
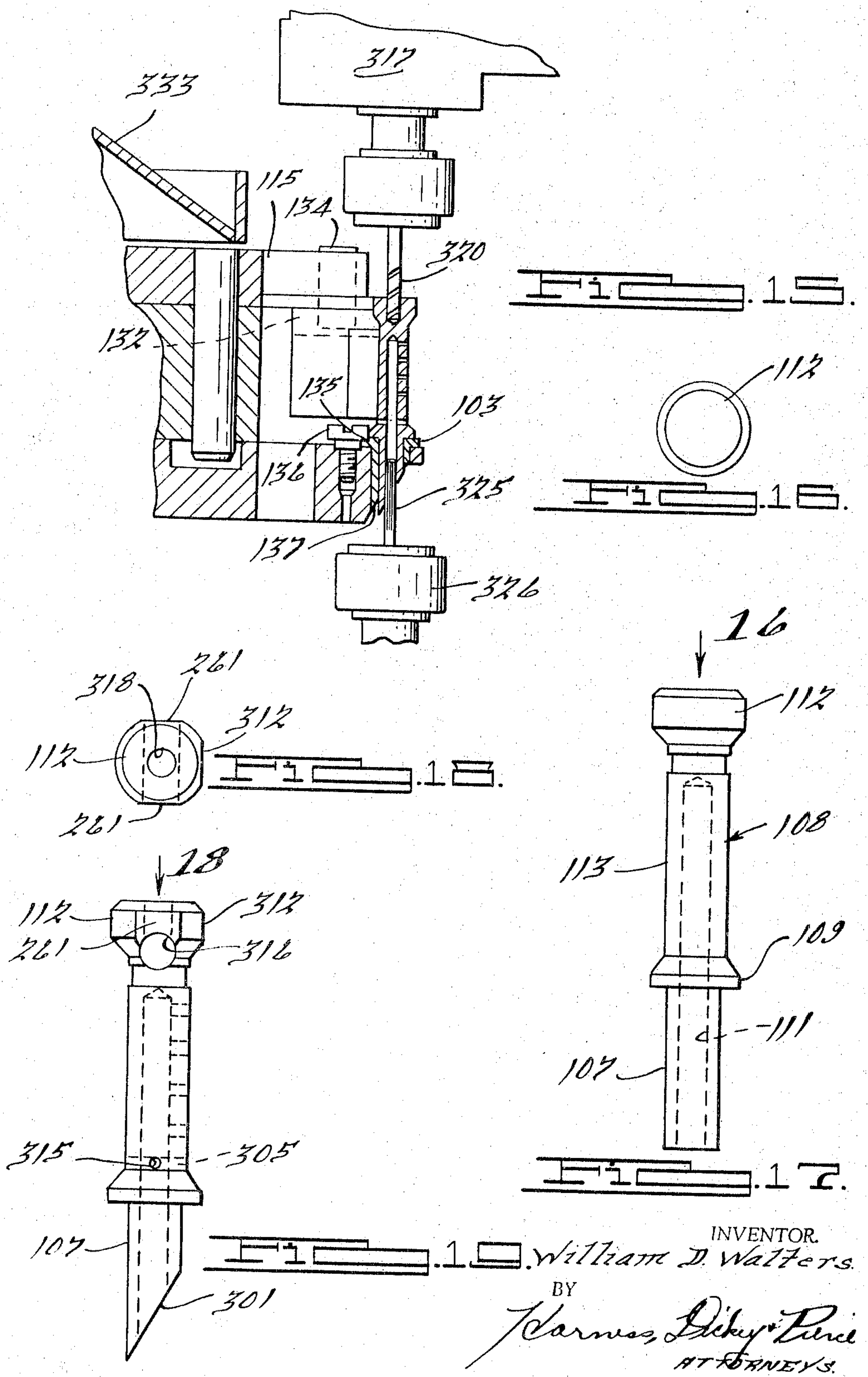
FIG. 15 is an enlarged broken sectional view of the structure illustrated in FIG. 1, taken on the line 15—15 thereof.
FIG. 16 is an end view of the workpiece which is to have work operations performed thereon by the machine illustrated in FIG. 1.
FIG. 17 is a view in elevation of the structure illustrated in FIG. 16, before the machine operations have been performed thereon.
FIG. 18 is a view of the structure of FIG. 16, after the machine operation has been performed thereon.
FIG. 19 is a view of the structure illustrated in FIG. 17, after the work operations have been performed thereon.

As illustrated in FIG. 8, a bar 89 is secured to the plate 86 for supporting a cylinder 91 on a pair of blocks 92 suspended below the bar 89. The piston rod 93 is movable in and out of the cylinder 91, the rod being provided with a clevis 94 which receives the head of a hollow tube 95 which is sealed to bearings 96 by O-rings 97. A fitting 98 is connected by a hose 99 to a suitable air supply. When the piston rod moves the tubular element 95 upwardly the end portion 101 of less diameter than the diameter of the workpiece engages the workpiece and raises it out of a supporting sleeve 103 until an aperture 104 in the side of the tube 95 reaches the area 105 between the bushings 97 whereupon the air under pressure will pass through the upper end of the tube and blow the workpiece from the sleeve 103 which is deflected into a hopper 106 in which the finished workpieces are collected. Thereafter the table 25 will be indexed moving the empty sleeve 103 into alignment with the pin 67 which will enter the sleeve and extend thereabove as illustrated in FIG. 24 to aid the insertion of a new workpiece over the pin and into the sleeve 103 at station No. 26, which is the first or loading station. The sleeve 103 supports the lower end 107 of the workpiece 108, as illustrated in FIG. 17. A flange 109 of the workpiece rests upon the top of the sleeve 103. An aperture 111 in the workpiece 108 extends inwardly from the bottom short of the head 112. The section 113 beneath the head and above the flange 109 is grasped by a set of jaws which are provided on the top of the table accurately aligned with each of the stations.

Figures 3, 4, 5:
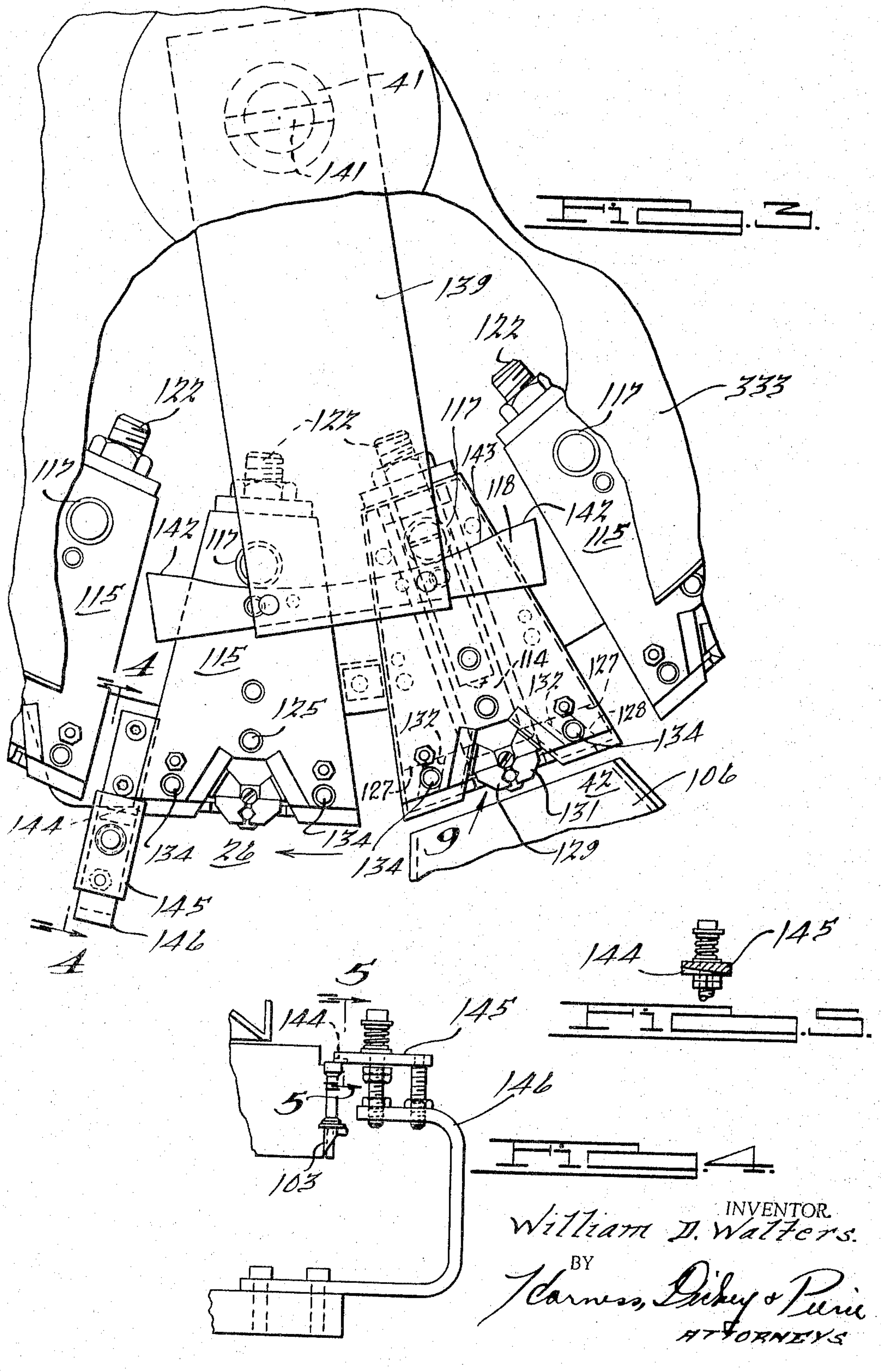
FIG. 3 is an enlarged broken view of the structure illustrated in FIG. 1, as viewed within the oval 2 thereof.
FIG. 4 is a broken sectional view of the structure illustrated in FIG. 3, taken on the line 4—4 thereof.
FIG. 5 is a broken sectional view of the structure illustrated in FIG. 4, taken on the line 5—5 thereof.
Figure 6:
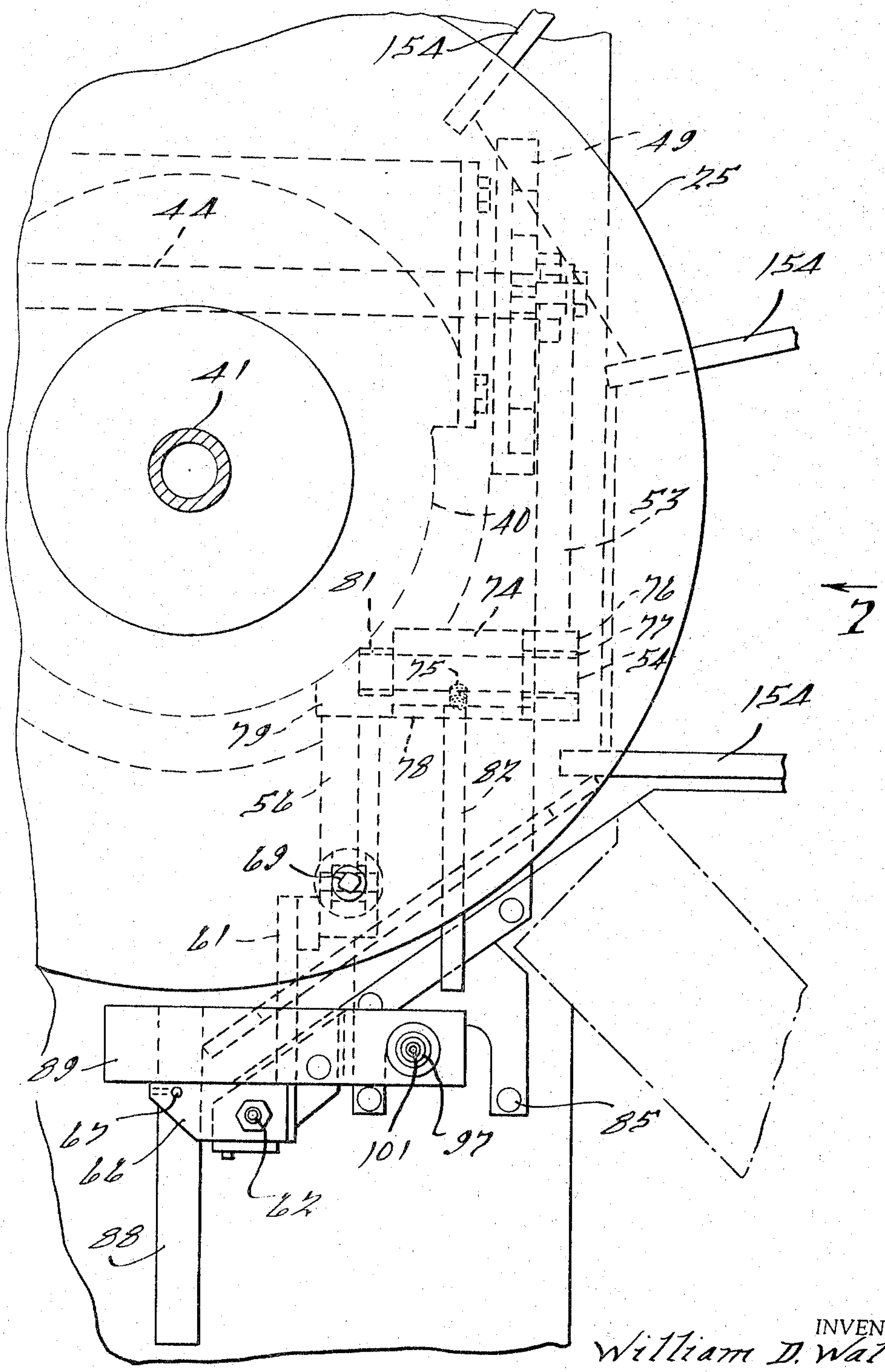
FIG. 6 is a broken plan view of the top of the table illustrated in FIG. 1.
Figure 1:
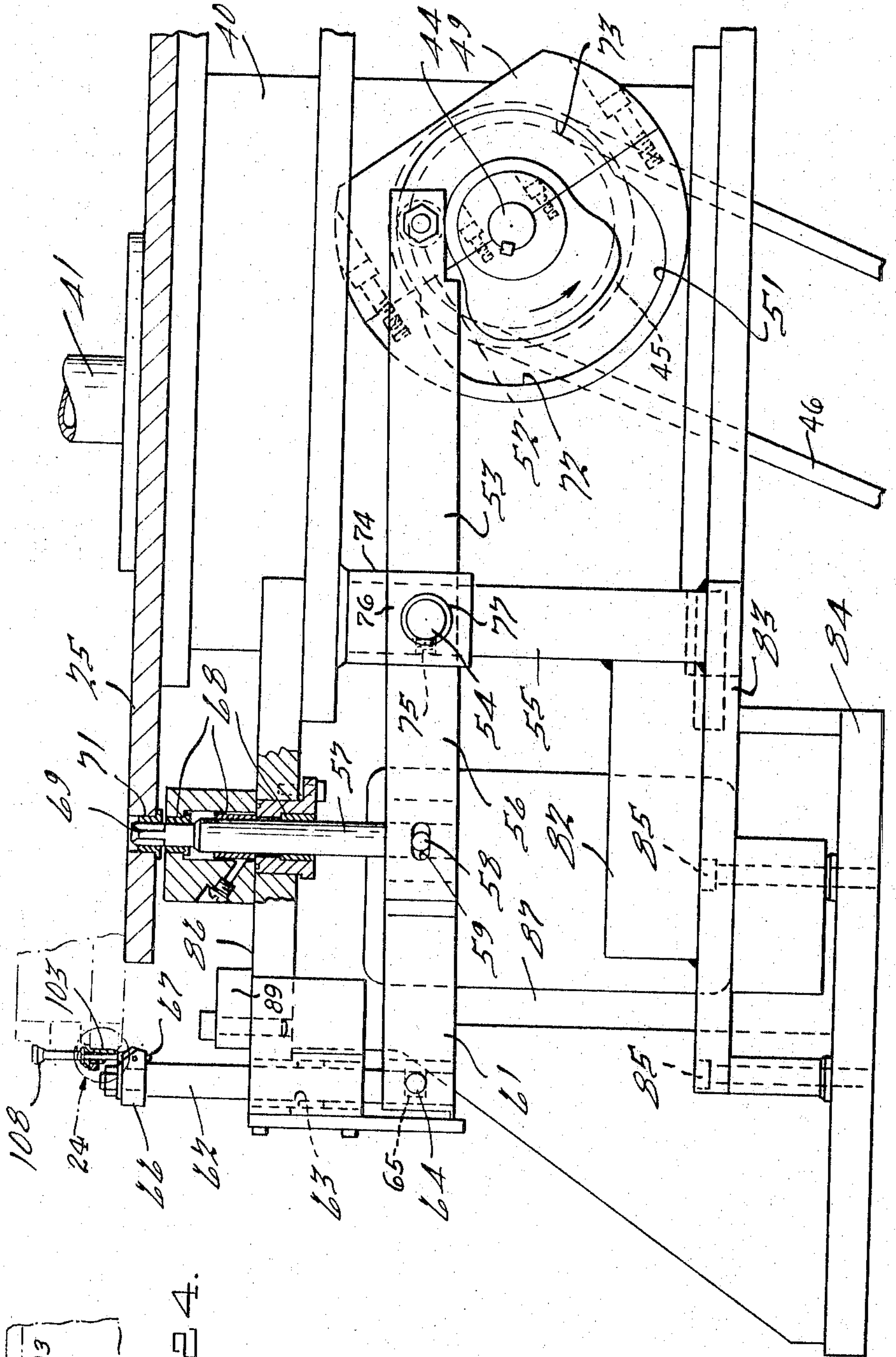
Figure 4:
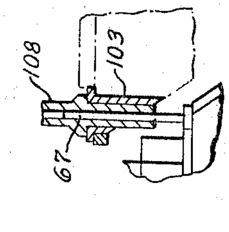

The jaws are more clearly illustrated in FIGS. 3 and 8 as embodying a housing 114 having a cover 115, the housing being urged radially outward of the central pillar 41 by a spring 116 and moved rearwardly by a roller 117 actuated by a cam 118. The roller is mounted on a shouldered screw 119, the housing 114 is mounted on a base 121 which is secured to the table top 25 at each of the stations. A screw 122 is threaded in an end plate 123 which is welded or otherwise secured to the base 121. The screw adjusts the tension on the spring 116 after which it is retained in adjusted position by a nut 124. A dowel pin 125 extends within a slot 126 in the base 121 for limiting the movement of the housing 114 and cover 115 but permitting the movement required to open the jaws. The forward end of the housing 114 has a horizontal transverse slot 127 which receives transversely movable slides 128 containing jaws 129 and 131 on the ends in adjacent clamping relation to each other, as clearly illustrated in FIG. 3. Each of the slides 128 has an angularly disposed slot 132 therein in which dowel pins 134 on the underside of the cover 115 extend. When the housing 114 is moved toward the center of the table, the slides 128 are moved outwardly to move the jaws 129 and 131 away from each other to release the workpiece 108. The flanged sleeve 103, as more clearly illustrated in FIG. 15, has a notch 135 therein which receives the head of a screw 136 to accurately locate the sloping surface 137 relative to the end mill 138 which is employed at stations 27 and 28.

The fixed pillar 41 at the center of the table has a supporting arm 139 secured thereto by a pin 141, as more clearly illustrated in FIG. 8. The outer end of the arm, as illustrated in FIGS. 3 and 8, support the cam block 118 which produces the separation of the jaws at the ejecting station 42 and retains them separated until they pass the loading stations 26. A dwell end 142 permits the roller 117 to move into engagement with the cam surface 143 after it moves the housing 114 toward the pillar 41 to thereby retain the slides 128 outwardly and separate the jaws 129 and 131. As the roller passes over the left hand dwell surface 142, it moves forwardly permitting the dowel cover 115 and pins 134 to move the slides 128 toward each other and thereby move the jaws into engagement with the work under pressure exerted thereon by the spring 116. As this is occurring, the head of the workpiece 112 engages a cam surface 144 on a spring pressed link 145, which is adjustably supported on a bracket 146. The spring pressed plate urges the workpiece downwardly until the flange 109 engages the sleeve 103 at the time the jaws close on the central section 113 of the workpiece to firmly retain the workpiece in exact location throughout its movement from one station to another.

As illustrated in FIG. 2, the main base 147 is hollow and is provided with a trough 148 at the top edge which slopes to an opening 149. The trough collects the coolant from the machine tools at the stations and delivering it and that from the supply conduits 150 from the mouth 149 into a coolant tank 151. A supply of the coolant is returned to the machine tools and to the conduits 150 by a motor driven pump unit 152. A washer-like base plate 153 is supported on the inner edge of the trough 148 in the base 147, having upstanding ribs 154 which support a plate 155 outwardly of the table 25 on which the machine tools are mounted at the stations where work operations are to occur. The base of the machine is secured to a floor by feet 156 having apertures therethrough through which anchor bolts extend.

Figures 21, 22:
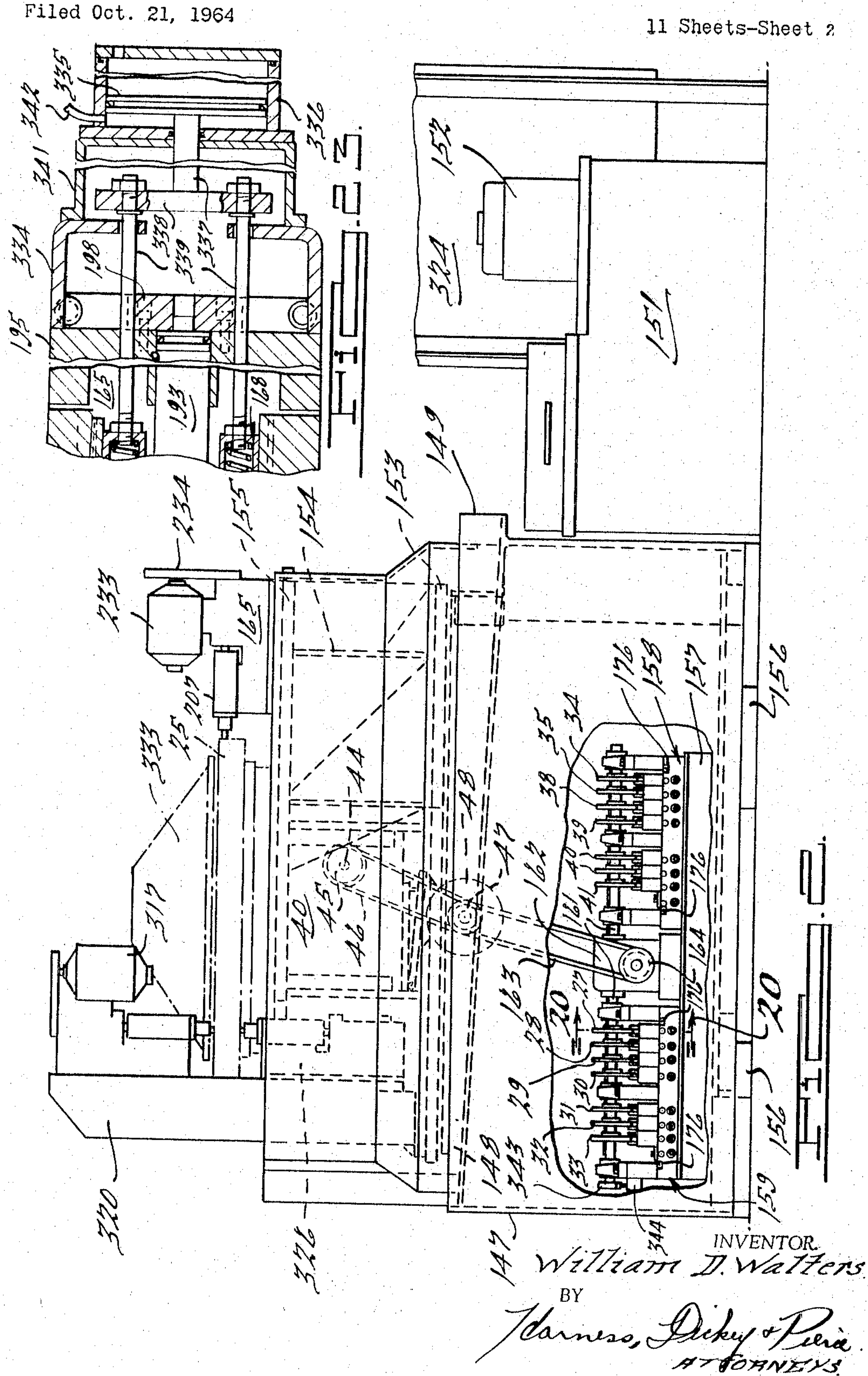
FIG. 21 is a schematic view showing the unit drive for the various operating elements of the machine.
FIG. 22 is a view of a chart showing the synchronized operations performed at each of the stations after a single advacement of the machine.

An I-beam 157 is mounted within the base at the bottom thereof for supporting a pair of cam driven actuators 158 and 159 having shafts 161 in adjacent relation which are connected to a worm drive 162 which is preferably of the enveloping type. A belt 163 connects a second pulley 160 on shaft of the motor 48 to a pulley 164 on the drive 162. The pulleys 45 and 164 and the two pulleys 47 and 160 on the motor 48, as illustrated in FIG. 21, are so selected as to operate all movable elements in synchronism so that a cycle at each station is repeated as the workpieces are advanced thereto. With this arrangement the machine continuously operates without any stopping of the motor or elements driven thereby.

Figures 10, 11:
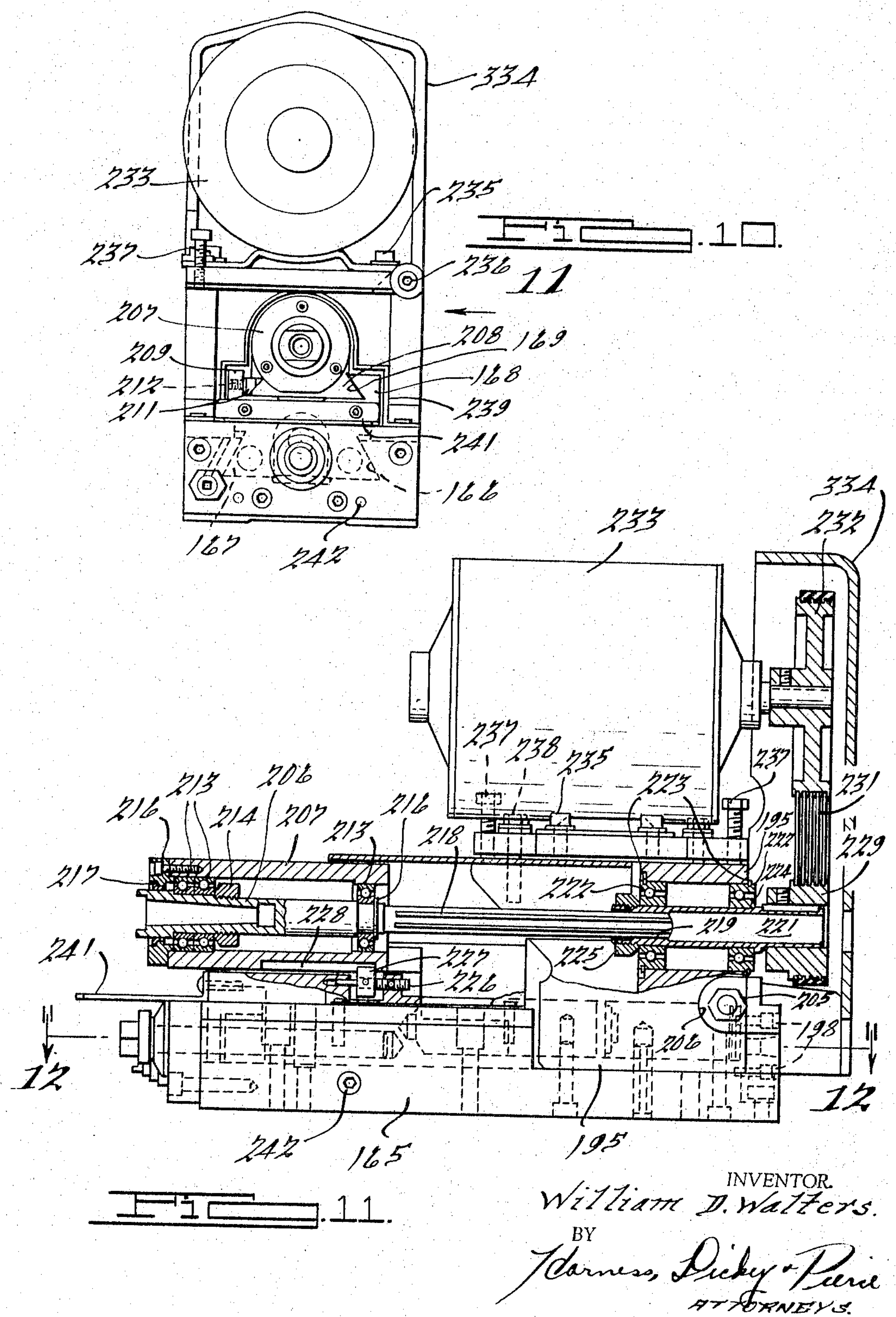
FIG. 10 is an enlarged view in elevation of one of a machine tool illustrated in FIG. 1, as viewed from the point 10 thereof.
FIG. 11 is a side view from the point 11 of the structure illustrated in FIG. 10, with parts in section.
Figure 12:
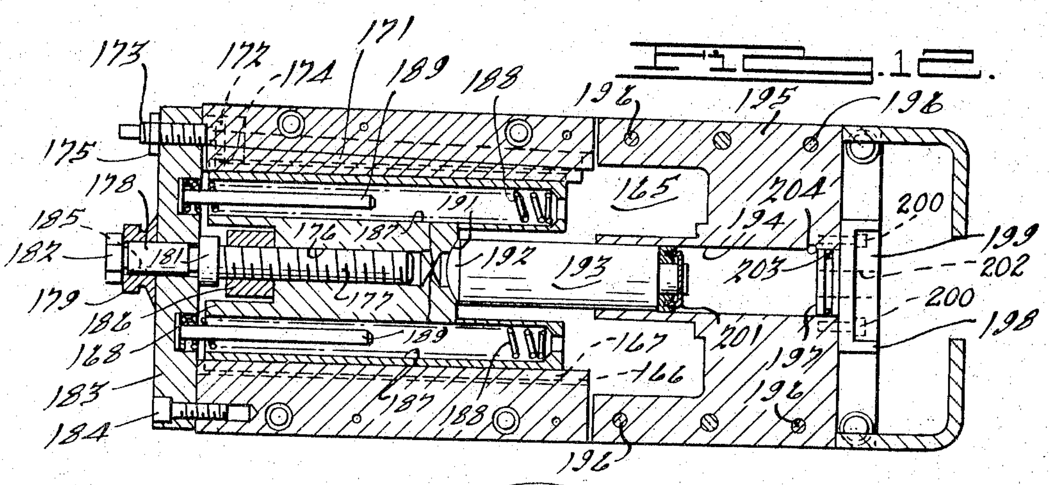
FIG. 12 is a sectional view of the structure illustrated in FIG. 11, taken on the line 12—12 thereof.

Referring more particularly to FIGS. 10, 11 and 12, the bases of the machine tools are of standard form with interchangeable parts so that different type of tooling may be carried thereby. The base 165 has a dovetail slot 166 in the forward portion thereof which receives a dovetail portion 167 of a slide 168 that has one portion of a dovetail slot 169 therein. The slide 168 is adjusted for clearance within the slot 166 by a wedge shaped element 171 which is moved lengthwise by a head 172 on a screw 173 which extends within a slot 174 in the wedge shaped element. By releasing a nut 175, the screw 173 can be adjusted to move the head 172 inwardly and outwardly and therefore move the wedge shaped element 171 lengthwise to adjust the clearance of the slide 168 within the dovetail slot 166. The slide 168 has an aperture 176 in which a threaded end 177 of a stem 178 is freely slidable. The stem 178 is rotatably adjusted by a knob 179 and is prevented from moving longitudinally by a flange 181 and a nut 182 which is screwed on the end of the stem against the knob to prevent any play therebetween. The stem extends through an end plate 183 which is secured to the end of the base 165 by a plurality of screws 184. The knob is secured on the stem 178 against rotation relative thereto by a key 185. A nut 186 is threaded on the threaded end 177 of the stem 178 to provide a stop for the slide 168 at the end of its forward movement. By adjusting the knob 179 in rotation, the nut will be moved backwardly or forwardly along the threaded end 177 to provide the stop position of the slide 168. The slide has apertures 187 for receiving springs 188, the ends of which abut the plate 183 and the end of the apertures guided. The springs extend over pins 189 which project inward from the end plate 183. The springs urge the slide 168 to the right to retain the engagement of an arcuate recess 191 with an arcuate end 192 of a piston 193. The piston is movable within a cylinder 194 in a block 195 which is secured to the right-hand end of the base 165 by screws 196. The opposite end of the cylinder 194 is enclosed by a head 197 carried by a plug 198 which is secured to the end of the block 195 by screws 200. An arcuate recess 199 is provided in the top portion of the plug 198 to provide clearance for the driving belt. The piston 193 has a seal 201 on the inner end to prevent the leakage of fluid which is delivered by a conduit connected to an aperture 202 to the plug 198 and head 197. The head is sealed to the wall of the cylinder 194 by an O-ring 203. A passageway 204 communicates with the cylinder 194 near the head end thereof, the passageway being closed by a threaded plug 205 within a recess 206 of the block 195. The plug is employed for bleeding off any air from the fluid system in communication with the cylinder 194. When fluid is introduced into the cylinder 194, the piston 193 is advanced to the left moving the slide 168 therewith until it strikes the stop nut 186. When pressure is removed from the fluid in the cylinder 194, it is moved therefrom by the tension in the springs 188 which return the slide and piston to their initial positions.

The slide 168 may carry different types of tools; the one illustrated in FIG. 11 has a rotatable collet 206 for supporting a drill, reamer and like tools. The collet is mounted within a boss 207 having a dovetail way 208 on the bottom which is disposed within a dovetail slot 169 of the slide 168. One side of the slot 169 is defined by a vertically disposed wall 209 against which a dovetail bar 211 abuts and engages one face of the way 208 on the boss 207. Screws 212 are threaded in apertures in the wall 209 and adjust the dovetail bar 211 toward or away from the wall to securely clamp the dovetail 208 and the boss 207 within the dovetail slot 169. The collet 206 is supported within the hollow interior of the boss on bearings 213, the front bearings have the inner races locked to the collet by a nut 214, the outer races being fixed to the boss 207 by the end plate 216. The rear bearing is locked on the reduced end of the collet 206 by a locking ring 215. The end plate 216 is secured by screws to the front face of the boss 207 with a sealing element 217 sealing the collet thereto. The right hand end of the collet, as illustrated in FIG. 11 has an extending spline shaft 218 which is in engagement with a spline 219 in a driving sleeve 221. The driving sleeve is mounted in the block 195 on ball bearings 222, the outer races of which are secured thereto by snap rings 223 which engage the outer ends of the block. The inner races are secured to the sleeve 221 by a shoulder 224 and a nut 225. The dovetail slot 169 in the slide 168 is employed for convenience in changing the bosses 207 and tools. The dovetail 208 is solidly clamped within the dovetail 169 by the dovetail bar 211. When the slide 167 is moved forwardly by the piston 193, the boss 207 is carried forwardly therewith while maintaining a driving relation between the spline shaft 218 and the sleeve 221. The boss 207 may be accurately positioned on the slide 167 by the use of the threaded screw 226 which adjusts the position of a block 227 which is engaged by the end face of a slot 228 in the bottom portion of the boss 207. Should the bar 211 be loosened so that the boss 207 can be slipped from the slide, it may thereafter be accurately positioned thereon by the block 227 when in engagement with the end of the slot 223.

The outer end of the sleeve 221 carries a pulley 229, which is connected by a belt 231 to a pulley 232 on the shaft of a motor 233. The motor is mounted on a plate 234 by screws 235. The plate is secured at one side by a hinge connection 236 and is moved upwardly or downwardly to change the tension on the belt 231 by the adjustment of screws 237 and 238 which lock the plate in adjusted position. The motor drives the sleeve 221 and therefore the spindle 206 in rotation while the slide 168 advances the boss 207 and spindle 206 at a predetermined rate to perform the machining operation. A guard plate 239 prevents contact with the rotating spline shaft 218 when the boss 207 is advanced and a guard plate 241 is secured to the forward end of the slide 168 to extend over the dovetail slot 166 when retracted. Apertures 242 are provided at different points on the base 165 for admitting grease to the slide surfaces to reduce the friction therebetween.

Figure 13:
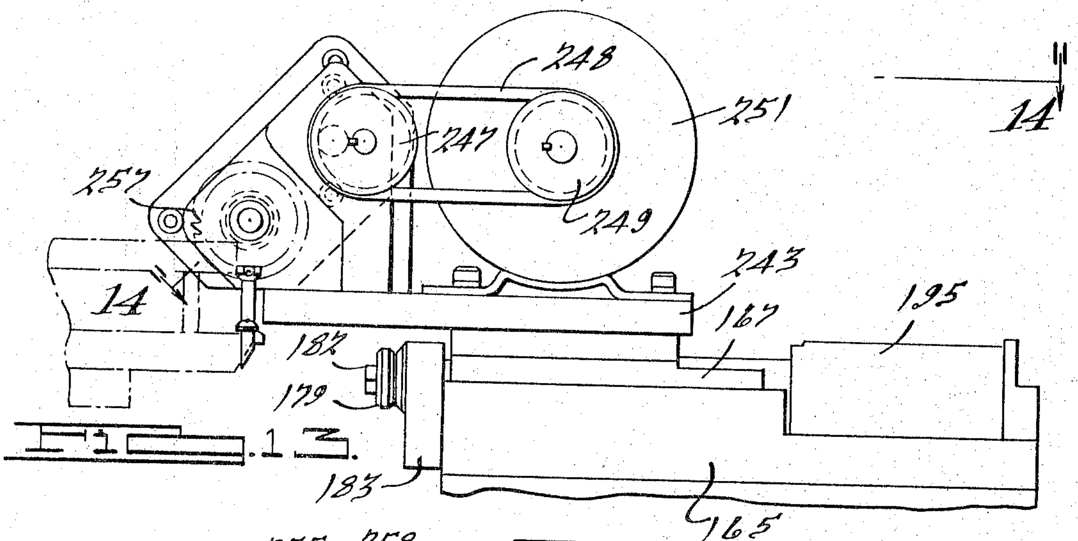
FIG. 13 is an enlarged broken sectional view of the structure illustrated in FIG. 1, taken along the line 13—13 thereof.
Figure 14:
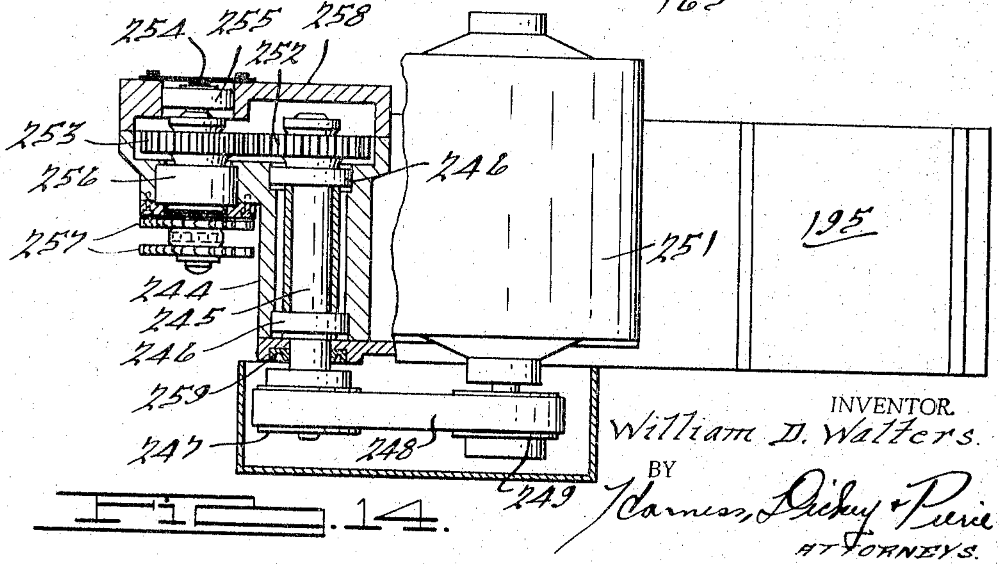
FIG. 14 is a sectional view of the structure illustrated in FIG. 12 taken on the line 14—14 thereof.

As pointed out hereinabove, different elements may be provided by attaching other types of tools to the slide 168. Referring to FIGURES 13 and 14, it will be noted that the slide 168 has a platform 243 secured thereto to move forwardly therewith. The forward end of the table has a casting 244 extending upwardly therefrom which supports a shaft 245 on ball bearings 246. The shaft has a pulley 247 on the extending end driven by a belt 248 from a pulley 249 on a motor 251 supported on the platform. The opposite end of the shaft 245 has a gear 252 secured thereto which meshes with a gear 253 on a shaft 254 mounted on bearings 255 and 256. A pair of spaced milling cutters 257 are carried by the end of the shaft on the center line of the base 167. A cover plate 258 encloses the gears 252 and 253 and a seal 259 seals the driven end of the shaft 245 in a conventional manner. As illustrated in FIG. 13, the milling cutters 257 when advanced, will machine opposite flat surfaces 261 on the head 112 of the workpiece 108 at the station 35, as clearly illustrated in FIG. 1. It will also be seen that any type of tooling may be applied to the base 165 and slide 167 driven by a motor 251 carried by the platform 243 on the slide, or from a motor 233 on the block 198 for driving the spline shaft 218 on the axis of the tool. The motors 233 and 251 are continuously energized during machine operations for continuously rotating the tools.

Figures 20, 21:
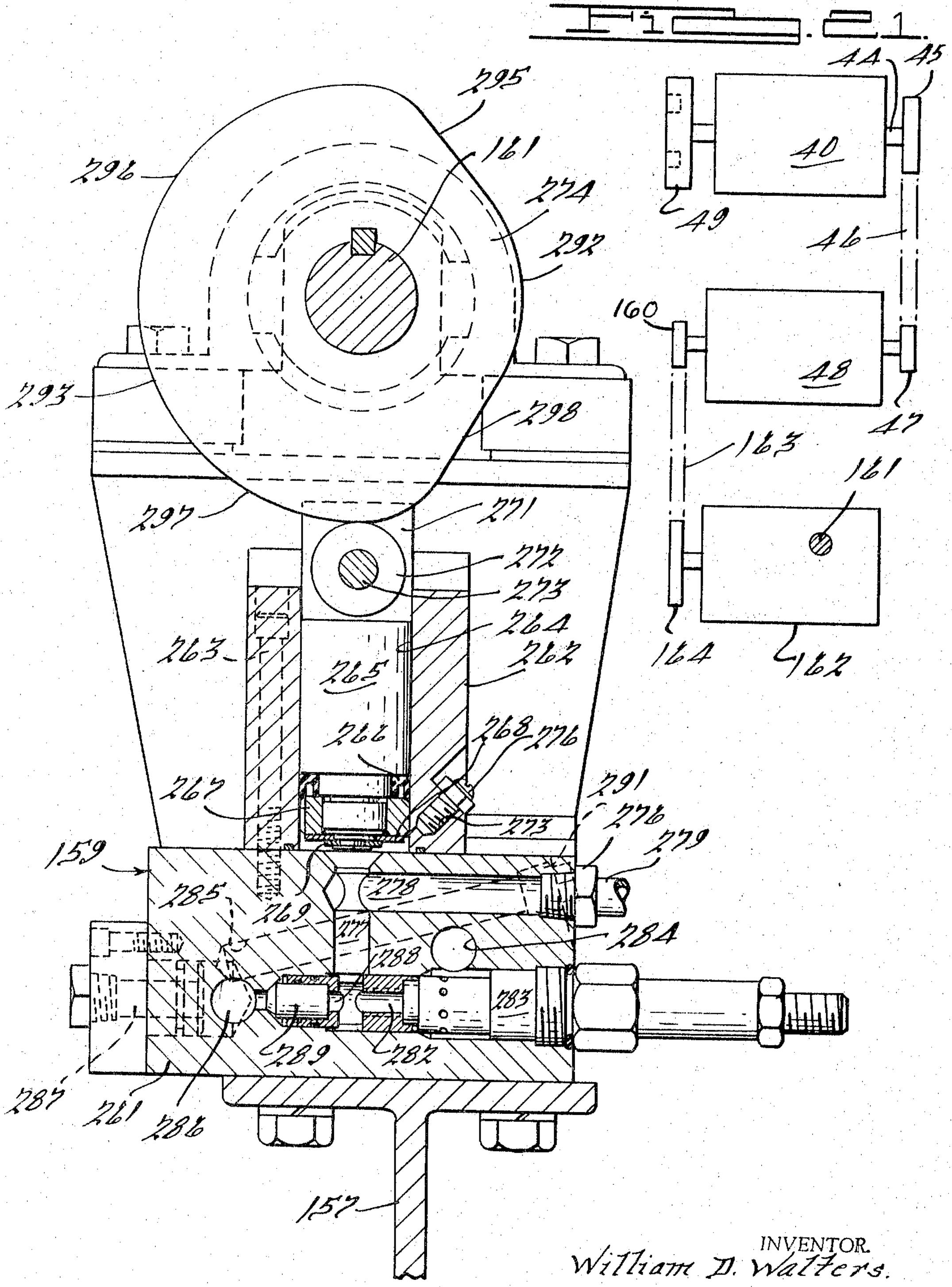
FIG. 20 is an enlarged sectional view of the structure illustrated in FIG. 2, taken on the line 20—20 thereof.
Figure 22:
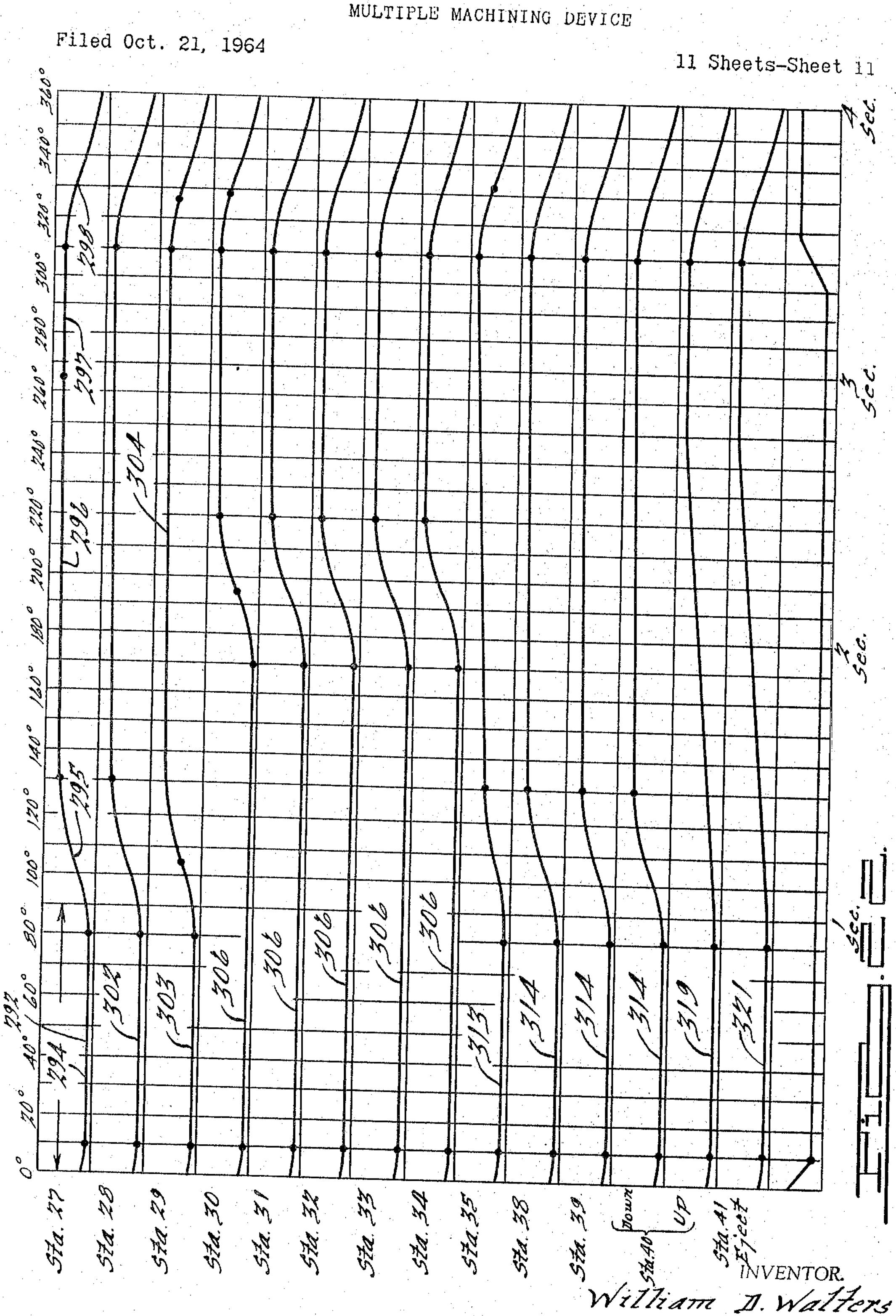

For advancing the tools toward the workpieces, fluid in independent closed systems is connected to each of the cylinders 194 in the blocks 195 for advancing the piston 193 therein to its forward position. The two devices, 158, 159, as illustrated in FIG. 20, have a manifold 261 on which a series of cylinder blocks 262 are secured by screws 263 to extend upwardly therefrom in aligned relationship. A cylinder 264 within the block contains a piston 265 having a sealing washer 266 on the bottom in abutting relation with a sleeve 267 retained thereon by a washer 268 and a retainer ring 269. The upper end of the piston has a slot 271 therein in which a roller 272 is supported on a pin 273. The shaft 161 of the devices 159 supports a cam disc 274 with its peripheral edge in engagement with the roller 272. The portion of the cam disc having the greatest radius deflects the piston toward the bottom of the cylinder 264 while that of reducing radius and the smaller radius permits the piston to move upwardly in the cylinder to its initial position. A passageway 275 near the bottom of the cylinder 262 is sealed by a removable screw 276 for bleeding off of any air which may accumulate within fluid system. The cylinder 264 communicates with a passageway 277 and a passageway 278 at right angles thereto, the latter being connected by a conduit 279 to the aperture 207 at the end of the cylinder 194 in the machine tool 281 located at the station 27 adjacent to the peripheral edge of the table 25. The passageway 277 communicates with a passageway 282 which is in communication with a relief valve 283 which is of the cartridge stye procurable from Fluid Controls, Inc., No. 60106–0, by way of example. Each time the slide 168 strikes the stop nut 186, the pressure of the fluid in the passageways 277 and 278 increase beyond a predetermined pressure and the valve 283 is open to discharge fluid into a passageway 284 which communicates with a passageway 285, passageway 286 and passageway 287 to a tank (not shown) having a pressure of air of from 15 to 25 lbs. on the fluid therein. At the end of each return stroke of the slide 168 the fluid in the tank will be forced over the relief valve 283 into the passageways 282, 288 and 277 and through the checkvalve 289 into the system to maintain it full of fluid at all times. Such a valve 289 is well known in the art, the one herein illustrated being known as the Kepner Check Valve No. 2203D–1 FS. The passageway 285 slopes upwardly and has a plug 291 in its outer end containing a screw 276 by which any air in the system may be evacuated so that a solid stand of liquid is present at all times between the ends of the pistons 193 and 265. When the roller 272 of the piston 265 is in engagement with the cam portion 292 of smallest radius, the piston is retracted by the tension in the springs 188 of the machine tool base 165. The springs move the slide 168 to the right along with the piston 193, which returns the liquid from the cylinder 194 through the conduit 279 to the cylinder 264 to move the piston upwardly and maintaining the roller 272 in engagement with the peripheral edge of the cam plate 274 at all times. As the cam plate rotates, the roller will pass from the cam portion 292 of smallest radius to the portion 293 of larger radius and move the piston downwardly to the bottom of the cylinder 262, as illustrated in FIG. 20 where it will be retained by the peripheral edge portion 293 as it passes over the roller 272. The cam surface portion 293 progressively increases in radius to provide the proper rate of feed to perform the machine operation. This is illustrated in FIG. 22 where the portion of the cam line 294 has the dwell portion corresponding to the cam edge 292 of smallest radius. The portion 295 corresponds to the increasing radius portion 295 of the cam plate 274, which moves the piston 265 downwardly .760 inch in 50° rotation of the cam plate. Thereafter a slow rise occurs to the cam along the line portion 296 moving the piston .120 inch downwardly in 120° travel, as the roller travels along the surface 296. The end portion 297 provides a movement of .020 inch in 60° rotation of the cam plate, after which the cam portion 298 permits the piston 265 to move upwardly until again it meets the dwell area 292.

At station 27 the lower end 107 of the workpiece has the sloping face 301 rough milled thereon, as illustrated in FIG. 19. At station No. 28, as indicated by the graph line 302 of FIG. 22, the sloping face 301 has a finish mill operation performed thereon, the numbers being applied to the stations as illustrated in FIG. 2. The shapes of the cams vary for different operations and are the same for other operations. For example, at station No. 29, the graph line 303 has a feed portion 304 which advances a drill through both walls of the working to produce the hole 305 in the workpiece 108. It will be noted that the graph line 306 is the same for the cam plates of stations 30, 31, 32 and 33 at which the drill at each station is advanced through a single wall of the workpiece 108 to drill the holes 307 therein. In FIG. 9 it will be noted that the drill 308 has a supporting sleeve 309 thereover which prevents it from whipping and to reduce breakage. Such a sleeve is employed on all of the small drills. As illustrated in FIG. 9, the gripping end of the jaw 129 is provided with clearance slots 311 to uncover the area in which the holes 307 are to be drilled.

It will be noted that at station 35, the graph line 306 is the same as that for stations 30 to 33; the cam disc advancing the machine tool to perform an end mill operation to produce a flat face 312 on the head 112 of the workpiece 108. At station 35, it will be seen that the graph line 313 has a rapid rise and long feed section for producing the straddle mill operation discussed hereinabove. The cam discs at stations 38, 39 and 40 have the same cam surfaces as illustrated in the graph line 314. At station 38 a small drill is passed through both sides of the workpiece 108, drilling the hole 315 which is in the plane of the hole 305 and at right angles thereto. At station 39, the machine tool is advanced to machine a hole 316 by a No. 30 drill through the upper portion of the workpiece 108 intersecting the lower portion of the head 112. The hole 316 is parallel to the hole 315. At station 40 down, the slide 168 of the machine tool 317 mounted on the column 320 is moved downwardly to drill the hole 318 on the center line of the head to a depth which will intersect the same size hole 316, as clearly illustrated in FIG. 19. At station 40 up, as illustrated in FIG. 22, the graph line 319 rises uniformly from the front dwell portion and dwells at the high portion for 60° and then returns to low dwell position. A similar machine tool 317 drives a reamer in alignment with the axis of the workpiece 108. The machine tool is mounted on the column 320 unto the reamer pointing upwardly for the purpose of reaming the hole 102 and deburing the inner edge of the sloping face 301. The up and down reaming and drilling operations at station 40 occur simultaneously. From FIG. 22 it will be noted that the graph line 321 at station 41 is the same as the graph line 319 for station 40 up. The cam plate at this station directs fluid into the cylinder 91 to move the piston rod 93, clevis 94 and tube 95 upwardly to raise the workpiece from the sleeve 103 at which time the flow of air ejects the finished workpiece into the chute 106.

All of the operations at stations 27 to 41 occur simultaneously and all the machine tools are retracted at the same time whereupon through the operation of the cam 49, the link 53 is tilted to retract the shot pin 57 to release the table. The cam portion of the drive mechanism within the housing 40 advances the table to the next station whereupon the cam 49 rocks the link 53 clockwise to insert the end 69 of the shot pin 57 within the bushing 71 of the table, to accurately locate it relative to the stations. At the same time, the shaft 62 is moved upwardly to insert the pin 67 through the sleeve 103 to guide a workpiece 108 therewithin. The dwell portion of the cam surface continues to advance within the housing 40 while the table 25 is at rest. During this time, the cam discs on the shafts 161 of the cam mechanisms 188 and 189, have the cam surfaces function in a manner to move all of the machining tools at stations 27 to 40 inclusive and the ejector tube 95 at station 41 toward the workpiece and to further advance the tools during the machine operations as related in detail hereinabove. Thereupon the cam 49 repeats its cycle of retracting the shot pin 57 and pin 67 from the bushing 71 and sleeve 103 and the cam surface of the driving mechanism in the housing 40 engages a cam follower on the under surface of the table supporting plate to advance the table the distance between stations whereupon the cam 49 will again insert the shot pin 57 and the pin 67 in the bushing 71 and sleeve 103, to permit the next succeeding machine operations to be performed on each of the workpieces being retained by the jaws 129 and 131 at each of the stations.

The machine tools 317 and 326 at the stations 40, "up" and "down," are mounted on a column 327 with the drill 320 and the reamer 325 in aligned relation, as illustrated at the end of the machine operations in FIG. 15. A switch 328 for starting and stopping the machine is mounted on the column 327 adjacent to the loading station 26. An electric control panel is mounted in a cabinet 324 and contains circuits which are connected to the various motors 251 of the machine tools and to the driving motor 48. Coolant is supplied from the tank 151 by the motor driven pump 152 to the various machine tools and to conduits 322 which flush the trough 148 into which the coolant from the machine tools flow. The coolant in the trough 148 returns to the tank 151 through the mouth of the trough 149. A truncated conical cover 333 is provided on the top of the table 25 to protect the clamping jaw mechanism and the cam plate 118. As illustrated in FIG. 11, when the motor 232 drives the belt 231 on the machine tools, a safety guard 334 is supported on the block 195 in the conventional manner. The nose of the hopper 106, as illustrated in FIG. 8, may have a coating of rubber or other resilient material 325 applied to the inner surface thereof to protect the finished workpieces 108 from damage when blown thereinto.

The pressure on the fluid in the tank (not shown) is not sufficient to counter balance the springs 188 of the slide 168 which returns the pistons 193 and 265 to their initial positions. The pressure on the fluid assists in retaining the piston 265 in its retracted position with the roller 172 in engagement with the cam 274. To assist the springs 188 in the return movement of the pistons 193 and 265 when the slide 168 is disposed in a vertical position; a helping cylinder is illustrated in FIG. 23. The piston 335 in a cylinder 336 has its piston 337 connected to a crossbar 338 which is joined by rods 339 to the ends of the slide 168. The rods pass through the safety guard 334 which supports a housing 341 to which the cylinder 336 is secured. At the time the springs 188 return the piston 193 to its initial position, fluid is admitted through the conduit 342 by the operation of a cam 343 which actuates a switch 344 to open a valve (not shown) to admit fluid to the cylinder 336 and move the piston 335 to assist the springs 188 to return the slide 168 and piston 193 to their initial positions. Thereafter and before the piston 193 is again moved outwardly of its cylinder, the switch 344 is again actuated to permit the fluid in the cylinder 336 to be returned to tank when the piston 335 is returned to its initial position by the movement of the rods 339 with the slide 168. Irrespective of the position of the slide and the weight of the machine tool carried thereby, the use of the piston 335 provides assurance that the slide and the machine tool carried thereby will be returned to its retracted position after each advancement thereof.

The machine is self contained and is compact, requiring a minimum of floor space. The machine is manually or hopper fed while being continuously operated. If the time of rotating the table advancing cam one revolution is four seconds, the table is advanced and retained stationary as the machine operations are performed on each workpiece. At the end of each four seconds of time, a new workpiece is loaded and a finished workpiece is ejected and in this manner, workpieces are completed at the rate of 15 a minute. This rate of production may vary when the machine is equipped for other workpieces having different machine operations performed thereon but in any case, at the end of each advancement of the table a finished workpiece will be ejected from the machine.

What is claimed is:

1. In a machine tool, a base having a cylinder, a piston in said cylinder, a slide on said base advanced by said piston, spring means in said slide for returning said slide and piston as the pressure in the cylinder is reduced, a tool-supporting member removably secured to said slide, and means for driving said tool-supporting member in rotation.

2. In a machine tool, a base having a cylinder, a piston in said cylinder, a slide on said base advanced by said piston, spring means in said slide for returning said slide and piston as the pressure in the cylinder is reduced, a tool-supporting member removably secured to said slide, means for driving said tool-supporting member in rotation, a second cylinder having a piston therein, cam means of predetermined shape in engagement with said piston for moving it within the cylinder when the cam means is rotated, and a fluid conduit connecting said two cylinders.

3. In a machine tool, a base having a cylinder, a piston in said cylinder, a slide on said base advanced by said piston, spring means in said slide for returning said slide and piston as the pressure in the cylinder is reduced, a removable boss fixed to said slide, a spindle rotatably supported by said boss, a spline shaft in extension of said spindle, a splined sleeve for engaging said spline shaft, and means for driving said sleeve in rotation while said slide and spindle is being advanced.

4. In a machine tool, a base having a cylinder, a piston in said cylinder, a slide on said base advanced by said piston, spring means in said slide for returning said slide and piston as the pressure in the cylinder is reduced, a removable boss fixed to said slide, a spindle rotatably supported by said boss, a spline shaft in extension of said spindle, a splined sleeve for engaging said spline shaft, means for driving said sleeve in rotation while said slide and spindle is being advanced, said movable boss having a dovetail way on the bottom and said slide having a dovetail slot, and means for clamping said dovetail securely in the slot to permit the boss to be readily removed and replaced.

5. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, and means for driving said cam device for moving said pistons therein for advancing the fluid and the pistons in the base of the machine tools for producing the advancement thereof and the work performing operations.

6. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, the cam means in said cam device providing a rapid advancement and a feed movement to the slide, and tools to perform the machine operations.

7. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, the cam means in said cam device providing a rapid advancement and a feed movement to the slide, tools to perform the machine operations, and a single motor for advancing said table and receiving it in advanced position and for operating the cam device in timed relation whereby when the table is accurately located, the machine tools perform different machine operations on the workpieces simultaneously.

8. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, the cam means in said cam device providing a rapid advancement and a feed movement to the slide, tools to perform the machine operations, a single motor for advancing said table and receiving it in advanced position and for operating the cam device in timed relation whereby when the table is accurately located, the machine tools perform different machine operations on the workpieces simultaneously, said advancing means for the table containing a drive element having a cam portion for advancing the table and a dwell portion which is driven when the table is stationary, and a continuously driven motor for operating said drive element.

9. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, the cam means in said cam device providing a rapid advancement and a feed movement to the slide, tools to perform the machine operations, a single motor for advancing said table and receiving it in advanced position and for operating the cam device in timed relation whereby when the table is accurately located, the machine tools perform different machine operations on the workpieces simultaneously, said advancing means for the table containing a drive element having a cam portion for advancing the table and a dwell portion which is driven when the table is stationary, a continuously driven motor for operating said drive element, and cam means driven by said motor for locking and releasing the table in advanced positions.

10. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, the cam means in said cam device providing a rapid advancement and a feed movement to the slide, tools to perform the machine operations, a single motor for advancing said table and receiving it in advanced position and for operating the cam device in timed relation whereby when the table is accurately located, the machine tools perform different machine operations on the workpieces simultaneously, said advancing means for the table containing a drive element having a cam portion for advancing the table and a dwell portion which is driven when the table is stationary, a continuously driven motor for operating said drive element, cam means driven by said motor for locking and releasing the table in advanced positions, and cam discs driven by said motor for advancing the machine tools toward the work after the table has been accurately located.

11. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, and ejector means ahead of the loading station at which the finished workpieces are ejected after each advancement of the table.

12. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, and means for driving said cam device for moving said pistons therein for advancing the fluid and the pistons in the base of the machine tools for producing the advancement thereof and the work performing operations, the side of one of the jaws gripping said workpiece having slots therein through which the tool may be advanced to perform the machine operation on the workpiece clamped thereby.

13. In a machine for performing a plurality of machine operations on workpieces at spaced stations simultaneously, a rotatable table, means for advancing said table a distance equal to that between stations, means for accurately locating said table after its advancement, clamping jaws on said table for supporting the workpieces at the stations, and machine tools at the station for performing the work operations, said machine tools having a base containing a cylinder, a piston in said cylinder, a slide on said base urged into engagement with said piston by spring means, tool supporting means on said slide, a motor for driving said tool-supporting means, a cam device for moving pistons into cylinders at a predetermined time and rate, conduit means joining said cylinders to the cylinders in said base having a solid stand of liquid in each system, means for driving said cam device for moving said pistons therein for advancing the fluid and the pistons in the base of the machine tools for producing the advancement thereof and the work performing operations, the side of one of the jaws gripping said workpiece having slots therein through which the tool may be advanced to perform the machining operation on the workpiece clamped thereby, and guide sleeves through which certain tools extend having a dimension which passes between said slots.

14. In a clamping means for a workpiece, a base, a slide on said base, a spring for urging said slide forwardly, cam means for urging said slide rearwardly for compressing said spring and for opening said jaws, said jaws having aligned sliding arm containing an angularly disposed slot, and pins in said slide extending in said slots for moving said jaws apart when the slide is moved to compress the spring and for moving the jaws toward each other when the spring is released to clamp a workpiece therebetween.

15. In a clamping means for a workpiece, a base, a slide on said base, a spring for urging said slide forwardly, cam means for urging said slide rearwardly for compressing said spring and for opening said jaws, said jaws having aligned sliding arm containing an angularly disposed slot, pins in said slide extending in said slots for moving said jaws apart when the slide is moved to compress the spring and for moving the jaws toward each other when the spring is released to clamp a workpiece therebetween, and cam means for urging the workpiece downwardly within the jaws to locate it lengthwise therein while being clamped by said jaws.

16. In a drive for a continuously operating machine, a table, drive means for moving a table a predetermined angle of advancement and stopping it while the drive means is continuously being driven, a cam plate on said drive means for operating a shot pin for accurately locating and locking the table after each advancement and for unlocking the table before each advancement, a motor having a shaft for driving said table drive means from one end, a cam-actuated machine tool advancing means driven from the opposite end of the motor shaft whereby the table advancements, its locking and release and the advancement of the machine tools to perform work occur in sequence while the motor is continuously driven.

17. In a machine tool, a base having a cylinder, a piston in said cylinder, a slide on said base advanced by said piston, spring means in said slide for returning said slide and piston as the pressure in the cylinder is reduced, a tool-supporting member removable secured to said table, means for driving said tool-supporting member in rotation, a second cylinder having a piston therein, cam means of predetermined shape in engagement with said piston for moving it within the cylinder when the cam means is rotated, a fluid conduit connecting said two cylinders, and a third cylinder having its piston connected to said slide for assisting the spring means in returning said slide and piston.

References Cited by the Examiner

FOREIGN PATENTS

| | | | |
|---|---|---|---|
| 2,361,091 | 10/1944 | Edelmann | 29—38.3 |
| 2,429,938 | 10/1947 | Mansfield | 29—38.3 X |
| 3,207,008 | 10/1965 | Roemer | 77—33.5 |

RICHARD H. EANES, Jr., *Primary Examiner.*